United States Patent [19]

Morse

[11] Patent Number: 5,143,624
[45] Date of Patent: Sep. 1, 1992

[54] METHODS FOR DETACKIFICATION OF PAINT SPRAY OPERATION WASTES

[75] Inventor: Lewis D. Morse, Pittsburgh, Pa.

[73] Assignee: Calgon Corporation, Pittsburgh, Pa.

[21] Appl. No.: 695,041

[22] Filed: May 2, 1991

[51] Int. Cl.[5] .................................. C02F 1/56
[52] U.S. Cl. ............................ 210/712; 55/85; 210/725; 210/727; 210/728; 210/734; 210/735; 210/930
[58] Field of Search .............. 55/85; 134/38; 210/712, 210/725, 727, 728, 734, 735, 930

[56] References Cited

U.S. PATENT DOCUMENTS

| | | | |
|---|---|---|---|
| 3,514,398 | 5/1970 | Schaper | 210/734 |
| 3,515,575 | 6/1970 | Arnold | 210/930 |
| 3,859,212 | 1/1975 | Smalley et al. | 210/734 |
| 3,861,887 | 1/1975 | Forney | 55/85 |
| 3,990,986 | 11/1976 | Gabel et al. | 252/315 |
| 4,002,490 | 1/1977 | Michalski et al. | 55/84 |
| 4,130,674 | 12/1978 | Roberts et al. | 252/180 |
| 4,440,647 | 4/1984 | Puchalski | 210/712 |
| 4,629,572 | 12/1986 | Leitz et al. | 210/714 |
| 4,637,824 | 1/1987 | Pominville | 55/85 |
| 4,656,059 | 7/1987 | Mizuno et al. | 210/735 |
| 4,853,132 | 8/1989 | Merrell et al. | 210/712 |
| 4,904,393 | 2/1990 | Mitchell et al. | 210/728 |
| 5,024,768 | 6/1991 | Merrell | 210/728 |

*Primary Examiner*—Peter Hruskoci
*Attorney, Agent, or Firm*—Carol S. Quagliato; Raymond M. Speer; Hesna J. Pfeiffer

[57] ABSTRACT

Poly(diallylamine) blended with poly(N-methylolacrylamide) effectively detackifies over-sprayed paint in the circulating water of a wet paint spray booth operation. After detackification the dispersed paint is flocculated with hydrolyzed polyacrylamide, the paint waste is removed, and the clarified water is recirculated back into the paint spray booth operation.

13 Claims, No Drawings

METHODS FOR DETACKIFICATION OF PAINT SPRAY OPERATION WASTES

BACKGROUND OF THE INVENTION

Automobile bodies and many industrial and consumer articles are conventionally spray painted in areas called spray booths, wherein water curtains are employed to cleanse the air of over-sprayed paint. The wash water is then treated to remove paint solids, and the treated water is recirculated.

A water curtain is typically created by pumping water into a trough above the over spray area. The overflow from the trough is controlled so that a uniform sheet of water falls along the length of the trough and down the booth's wall. Spray nozzles are also commonly used. Fine droplets of over-sprayed paint, emitted by a spray gun, contact and are captured by the water curtain. The amount of paint contacting a water curtain may change depending on a number of variables, including plant or process shutdowns, the size and shape of the object being painted, the type of spray equipment used, the spraying and purge technique used, and the water flow and type of paint used.

A major problem associated with spraying operations concerns the tacky or adhesive nature of the over-sprayed coating materials. Solids tend to agglomerate and accumulate on the walls, ceiling and floor of the spray area and to clog water spray equipment, recirculating pumps and the like. Paint that sticks to spray booth surfaces usually cannot be easily removed from the equipment and tends to build up over time, which hampers spray booth efficiency. Thus, the over-spray, or paint mist, captured in the water system of a spray booth must be detackified, or "killed", before it adheres to the walls, piping, etc., of the spray booth.

The term "paint killing", as used herein, refers to the act of detackifying over-sprayed paint in paint spray booths.

The term "solvent-based paints" as used herein refers to all common varieties of water insoluble coatings commonly applied in spraying operations, including but not limited to oil base paints, enamels and lacquers. As used herein, the terms "solvent-based paints" and "water-based paints" are synonymous.

A wide variety of chemicals have been proposed as treating agents for circulating wet spray booth waters containing over-sprayed paint, including compositions containing polymers and amphoteric metal salts which form insoluble hydroxides at pH's greater than about 7. The use of combinations of this type are described in the following U.S. Patents: U.S. Pat. Nos. 3,861,887 to Forney; 3,990,986 to Gabel et al.; 4,002,490 to Michalski et al.; 4,130,674 to Roberts et al.; and 4,440,647 to Puchalski. Further, U.S. Pat. No. 4,637,824 to Pominville discloses the use of silicates and polydiallyldialkylammonium halides with amphoteric metal salts, and U.S. Pat. No. 4,853,132 to Merrell et al. discloses the use of precipitates formed by the reaction of cationic polymers and salts of inorganic anions to detackify solvent-based paints. Bentonite clays, aluminum salts and zinc salts have also been used with cationic polymers.

U.S. Pat. No. 4,656,059 to Mizuno et al. relates to the use of melamine-aldehyde acid colloid solutions for treating paint in wet spray booths, and U.S. Pat. No. 4,629,572 to Leitz et al. relates to the use of urea or amino triazine-aldehyde condensation reaction products in combination with water-swellable clays to treat paint spray booth wastes.

While these compositions are generally effective in detackifying and removing paint over-spray, problems of varying degree still remain with paint tackiness, "live" paint remaining after treatment, and incomplete water clarification.

The instant invention represents an alternative to the inventions of the prior art in that a stable, water-based alkaline composition containing a mixture of poly(N-methylolacrylamide) and poly(diallylamine), used in conjunction with a flocculant, can be used with great efficiency to treat circulating paint spray booth waters containing all types of paints and particularly solvent-based paints, lacquers and enamels.

SUMMARY OF THE INVENTION

The instant invention relates to a mixture of poly(diallylamine) (or "poly(DAA)") and poly(N-methylolacrylamide) (or "poly(N-MAM)") in conjunction with specified alkalinity sources and polymeric flocculants, applied within designated operating ranges, which can be used with improved results to treat water which contains solvent-based paints. Such water, after being treated to capture and collect the over-sprayed, solvent-based paint contained therein is typically recirculated in paint spray booth operations.

More particularly, the present invention relates to methods of treating circulating paint spray booth water containing over-sprayed solvent-based paint to facilitate removal of the paint from the water. The methods comprise adjusting the alkalinity of the circulating paint spray booth water being treated to between about 20 and 600 ppm, on a calcium carbonate basis, by adding an alkalinity source thereto; adding an effective amount of a mixture of poly(DAA) and poly(N-MAM) to the water being treated; contacting over-sprayed, solvent-based paint with the alkalinity adjusted paint spray booth water after the addition of an effective amount of the poly(DAA)/poly(N-MAM) mixture to the paint spray booth water; adding an effective amount of a flocculant to the alkalinity and poly(DAA)/poly(N-MAM)-treated and paint-containing paint spray booth water, and removing resulting sludge from the paint spray booth water. The methods of the present invention are highly efficient for treating systems containing a wide variety of solvent-based paints. Additionally, the present methods generally produce a low-volume, flocculated, predominantly organic sludge which may be readily disposed of in land fills or by incineration.

The instant invention additionally relates to paint detackifying compositions comprising poly(DAA) and poly(N-MAM).

These and additional advantages will be more apparent in view of the following detailed description.

DETAILED DESCRIPTION

The novel method of the present invention involves treating circulating paint spray booth water containing over-sprayed, solvent-based paint to facilitate the removal of the over-sprayed paint from the spray booth water. The present method comprises adjusting the alkalinity of the water in the aqueous system being treated, namely circulating paint spray booth water, to between 20 to 600 ppm, on a calcium carbonate basis, and preferably, to between 50 to 400 ppm as $CaCO_3$; adding to the water an effective amount of a mixture of poly(DAA) and poly(N-MAM); contacting over-sprayed solvent-based paint with the alkalinity-adjusted water after the addition of an effective amount of the poly(DAA)/poly(N-MAM) mixture; adding a flocculant to the water after the solvent-based paint contacts the alkalinity and poly(DAA)/poly(N-MAM)-treated water; and removing resulting sludge from the water being treated.

Before over-sprayed, solvent-based paint contacts paint spray booth water the alkalinity of the water in the paint spray booth system being treated should be adjusted to provide a minimum alkalinity of about 400 ppm (as $CaCO_3$) to a maximum alkalinity of about 600 ppm. Preferably, the alkalinity should be maintained between about 50 and about 400 ppm (as $CaCO_3$), and most preferably between about 100 and 200 ppm (as $CaCO_3$). These alkalinity ranges are generally critical. At higher alkalinity dosages, paint solids become increasingly difficult to capture, which decreases separation efficiency. At even higher dosages, the paint solids tend to sink instead of float. If sufficient alkalinity is not present (i.e., below about 20 ppm), the poly(DAA)/poly(N-MAM) mixture is not as effective, resulting in very poor collection efficiency.

Additionally, the pH of the water being treated should be maintained between about 6.0 and about 8.0, preferably between about 6.0 and about 7.5. A pH of at least about 6.0 is desirable in order to activate the poly(DAA)/poly(N-MAM) mixture. As the pH is lowered below about 6.0, corrosion in the system generally increases. On the other hand, a pH of greater than about 8.0 generally results in greater solids dispersion thus creating less efficient solids capture, and causes greater foam generation.

Alkalinity can be added in the form of carbonates, for example, alkali metal carbonates and alkali metal bicarbonates such as sodium carbonate or sodium bicarbonate, NaOH, KOH, silicates and/or blends thereof. However, preferred alkalinity sources are alkali metal carbonates and silicates, with sodium carbonate, sodium bicarbonate, and mixtures thereof being especially preferred. These alkalinity sources are generally inexpensive and safe to use, and they provide excellent flotation to the solvent-based paint solids when used in combination with polymeric flocculants. Thus, alkalinity, particularly carbonate alkalinity, assists in floating the flocculated paint particles to the surface of the water system being treated.

The alkalinity should be adjusted so that the water forming the curtain which contacts the over-sprayed paint or paints is in the designated alkalinity range. Any method of adding the source of alkalinity can be used, including batch or continuous addition, with continuous addition being preferred.

In addition to the alkalinity requirement, an effective amount of a poly(DAA)/poly(N-MAM) mixture should be added to or maintained in the water being treated. As used herein, the term "effective amount" refers to that amount of poly(DAA)/poly(N-MAM) mixture which achieves the desired water clarity and paint solids capture after addition of flocculant to the system being treated.

The instant poly(DAA)/poly(N-MAM) mixture is soluble in water, and is best utilized in aqueous solutions. The percent by weight on an active basis of the poly(DAA)/poly(N-MAM) in a solution should range from about 3% to 15%, preferably from about 5% to 10%, and most preferably from about 7.5% to 8.5%, due to cost and product stability considerations. The pH should be sufficiently low to keep the poly(DAA)/poly(N-MAM) mixture in solution.

The ratio by weight on an active basis of poly(DAA) to poly(N-MAM) in the poly(DAA)/poly(N-MAM) mixture should be from about 1:10 to 1:1, preferably from about 1:6 to 1:2 and most preferably about 1:4.

The poly(DAA)/poly(N-MAM) mixture can be applied intermittently or continuously to the water system being treated. Since spraying is generally continuous, continuous addition of the poly(DAA)/poly(N-MAM) mixture is preferred. The poly(DAA)/poly(N-MAM) mixture may be added at any convenient location, but is preferably added so as to allow the maximum concentration of poly(DAA)/poly(N-MAM) to contact the over-sprayed paint(s). For example, the poly(DAA)/poly(N-MAM) mixture may be added to a line supplying the trough or other device used to form the water curtain. Multiple points of addition may be used. In a typical paint spray booth operation, the return water from the booth generally encounters extreme turbulence. This turbulence improves the efficacy of the treatment by promoting intimate contact between the paint and the poly(DAA)/poly(N-MAM).

The poly(DAA)/poly(N-MAM) mixture should be added to the water being treated in a preferred dosage of from between about 0.001 to about 1.0 part poly(DAA)/poly(N-MAM) mixture (active basis) per part paint, most preferably between about 0.01 and about 0.5 part poly(DAA)/poly(N-MAM) mixture per part paint. The alkalinity adjustment and poly(DAA)/poly(N-MAM) mixture addition steps may be carried out simultaneously, noting, however, that alkalinity adjustment and poly(DAA)/poly(N-MAM) mixture addition both occur prior to contact between the over-spray paint and the circulated paint spray booth water. The key factor is that the over-sprayed paint contact water within the desired alkalinity range which already contains an effective amount of a poly(DAA)/poly(N-MAM) mixture.

After over-sprayed, solvent-based paint contacts alkalinity and the poly(DAA)/poly(N-MAM) in the circulating water, a polymeric flocculant is added to the paint spray booth water system. The flocculant promotes the formation of a buoyant floc structure by binding the conditioned paint particles and incorporating air into the floc structure. The resulting floating floc facilitates the removal of paint solids from the circulating water system.

According to this invention, it has been found that the type and the molecular weight of the polymeric flocculant used are both important factors. A suitable flocculant for use with poly(DAA)/poly(N-MAM) paint detackification is a hydrolyzed polyacrylamide, preferably a 30% hydrolyzed polyacrylamide. Generally, a flocculant having a weight average molecular weight of at least $1 \times 10^6$ is preferred. More preferably, the molecular weight should be between about $5 \times 10^6$ and $20 \times 10^6$. The hydrolyzed polyacrylamide flocculant should be dispersed in water to make a final solution of preferably from about 0.040% to 0.060% by weight on an active basis, and more preferably between 0.045% and 0.055%

An effective amount of the polymeric flocculant should be added. The effective amount depends upon the quantity of poly(DAA)/poly(N-MAM) mixture present in the system being treated. Preferably, the effective flocculant dosage will range from about 0.01 to about 150 parts (active basis) of the polymeric flocculant per part poly(DAA)/poly(N-MAM) mixture (active basis) and more preferably, from about 0.1 to 20 parts of the polymeric flocculant per part poly(DAA)/poly(N-MAM) mixture.

The function of the polymeric flocculant is two-fold: it reacts with the poly(DAA)/poly(N-MAM) treated paint solids to form a large, buoyant, easily captured floc, and it reduces or totally eliminates foam formation in the system by removing colloidal particulates present in the water.

A requirement of the present invention is that the flocculant be added to the paint spray booth water after the over-sprayed, solvent-borne paint is contacted with the alkalinity adjusted paint spray booth water and poly(DAA)/poly(N-MAM) mixture. Once the poly(DAA)/poly(N-MAM) treated paint solids have been contacted with at least one polymeric flocculant, the resulting sludge is removed from the water. This removal may be facilitated by any means known in the art, including, but not limited to, air flotation and filtration.

Other additives commonly used for the treatment of water containing over-sprayed paint may be used in conjunction with the instant method. For example, bentonite clays, carbon black, talc, gums starch, dextrin, lime, aluminum oxide, silica solids, and casein among other additives, may be used as additional process aids in conjunction with the primary steps of the instant method. Additives from the class of amphoteric metal salts, including, but not limited to, alum, aluminum chloride, ferric sulfate and ferric chloride, can also be used to enhance the performance of the instant invention.

The following examples are given for the purpose of illustrating the present invention and shall not be construed as being limitations on the scope or spirit of the instant invention. Unless otherwise specified, reference to percentage or parts are by weight.

EXAMPLE 1

Preparation of Poly(N-methylolacrylamide)

Tetrasodium EDTA (0.17 g) and 1.34 g of 88% aqueous formic acid were dissolved in 194.4 g of deionized (D.I.) water. The pH was adjusted from 3.1 to 7.2 with 9.0 ml of 10% aqueous NaOH, and the mixture was charged to a kettle fitted with a reflux condenser, stirrer, thermometer, feed lines and oil bath, and heated to reflux with stirring. 2,2'-azobis(2-amidinopropane)dihydrochloride (1.55 g) in 35.87 g D.I. water was fed to the refluxing system with stirring over three hours via Sage pump. Starting simultaneously with the initiator feed, 166.67 g of 48% aqueous N-methylolacrylamide was fed to the system over two hours at 2.56 g/min. for 30 minutes, followed by 0.93 g/min. for 90 minutes. The batch was held at reflux with stirring for one hour after finishing initiator feed.

The final product was very pale green, clear, with a Brookfield viscosity of 41 cps and pH of 5.5.

EXAMPLE 2

Preparation of Poly(diallylamine)

Concentrated hydrochloric acid (97.0 g) was added dropwise with stirring to 97.0 g chilled diallylamine in a kettle fitted with a stirrer, thermometer, reflux condenser, feed line and an oil bath. 88% Aqueous formic acid (1.13 g) and 46.5 g of D.I. water were added, and the system was heated to 85° C. with stirring. Sodium persulfate (14.84 g) dissolved in 22.26 g D.I. water was fed to the monomer over 1½ hours via Sage pump. The system exothermed within 3 minutes to 106.5° C. After initiator feed was completed, the temperature was held at 78° C. for one hour.

The final product was clear orange with a Brookfield viscosity of 2140 cps, pH 0.5, and 36.6% polymer content.

EXAMPLE 3

A blend was prepared of: 20.00 g of Example #1 material (20.0% active); 2.74 g of Example #2 material (36.6 active); and 40.55 g of D.I. water. This provided poly(DAA)/poly(N-MAM) at a 1:4 molar ratio.

EXAMPLE 4

A blend was prepared of: 1.92 g of Epichlorohydrin-based polyamine (52.1% active); 14.70 g of Example 1 material (20.0% active); and 33.25 g of D.I. water. This provided polyamine/poly(N-MAM) at a 1:4 molar ratio.

EXAMPLE 5

The polymers of Examples 1–4 were evaluated for paint kill, paint dispersion, and capability of forming floc using a jar test. The jar test consisted of stirring vigorously with a magnetic stirring bar 200 ml of cold tap water made alkaline with 0.1% sodium carbonate. A potential paint kill polymer was added to make it 0.02% in the 200 ml of alkaline tap water. Then six drops of a PPG white enamel automobile paint were added and the aqueous mixture was stirred for ½ minute. The stirring was stopped to see if the paint was well dispersed, sticky or smeary. Stirring was resumed, 2.0 ml of a floccing agent (30% hydrolyzed polyacrylamide, mol. wt. 16 MM, 0.05% active) added, and stirring continued for another ½ minute to see if the paint flocced. Some of the paint was squeezed between the thumb and forefinger. With proper paint kill, there was neither stickness nor paint smear on the fingers. Observations were as follows:

| Example # | Paint Kill Composition | Jar Test Rresults |
|---|---|---|
| 1 | Poly(N-MAM) | No paint kill; no dispersion. |
| 2 | Poly(DAA) | No paint kill; no dispersion. |
| 3 | Poly(DAA) + Poly(N-MAM) | Paint kill; well dispersed paint droplets that form a floating floc with hydrolyzed polyacrylamide. |
| 4 | Polyamine + Poly(N-MAM) | No paint kill; no dispersion. |

When poly(DAA) was blended with poly(N-MAM) at 1:4 molar ratio, good paint kill and dispersion resulted. The dispersed paint could be flocculated with hydrolyzed polyacrylamide. Neither homopolymer was effective when used alone. A blend of an epichlorohydrin-based polyamine with poly(N-MAM) showed no paint kill or dispersion.

What is claimed is:

1. A method of treating circulating paint spray booth water containing over-sprayed, solvent-borne paint, which comprises:
    (a) adjusting the alkalinity of the water to between about 20 and 600 ppm, on a calcium carbonate basis, by adding a source of alkalinity to the water;
    (b) adding to the water a mixture of a homopolymer of poly(diallylamine) and a homopolymer of poly(N-methylolacrylamide) wherein the weight ratio of poly(diallylamine) to poly(N-methylolacrylamide) in the mixture is in the range of about 1:10 to 1:1 on an active basis;

(c) contacting the over-sprayed, solvent-borne paint with the water after completing step (a) and step (b);

(d) adding an effective amount of a flocculant to the water after completing steps (a), (b) and (c); and (e) removing resulting sludge from the water.

2. The method defined by claim 1, wherein the alkalinity of the water is adjusted to between about 50 and 400 ppm.

3. The method defined by claim 1, wherein the pH of the water is maintained in the range of about 6.0 to about 8.0.

4. The method defined by claim 1, wherein the alkalinity source is selected from the group consisting of carbonates and silicates.

5. The method defined by claim 4, wherein the alkalinity source is selected from sodium carbonate, sodium bicarbonate and mixtures thereof.

6. The method defined by claim 5 wherein the alkalinity source is sodium carbonate.

7. The method defined by claim 1 wherein the weight ratio of poly(diallylamine) to poly(N-methylolacrylamide) in the mixture is in the range of about 1:6 to 1:2 on an active basis.

8. The method defined by claim 7 wherein the weight ratio of poly(diallylamine) to poly(N-methylolacrylamide) in the mixture is about 1:4 on an active basis.

9. The method defined by claim 1 wherein the mixture of poly(diallylamine) and poly(methylolacrylamide) is in an aqueous solution in the range of about 3% to 15% by weight on an active basis.

10. The method defined by claim 9 wherein the percent by weight of the mixture of poly(diallylamine) and poly(methylolacrylamide) in the aqueous solution is in the range of about 5% to 10%.

11. The method defined by claim 10 wherein the percent by weight of the mixture of poly(diallylamine) and poly(methylolacrylamide) in the aqueous solution is in the range of about 7.5% to 8.5%.

12. The method defined by claim 1 wherein the flocculant is a hydrolyzed polyacrylamide.

13. The method defined by claim 12 wherein the hydrolyzed polyacrylamide has a weight average molecular weight in the range of about $5 \times 10^6$ to $20 \times 10^6$.

* * * * *